(12) United States Patent
Lee et al.

(10) Patent No.: US 12,703,304 B2
(45) Date of Patent: Aug. 11, 2026

(54) FIVE AND SIX BAR LINKAGE MECHANISMS FOR VEHICLE STEPS

(71) Applicant: Magna Exteriors Inc., Aurora (CA)

(72) Inventors: V-Bond Lee, Newmarket (CA); Chi Zhang, Burnaby (CA); Desmond P Jamieson, Toronto (CA); Jerry Godfrey, Schomberg (CA)

(73) Assignee: Magna Exteriors Inc., Aurora (CA)

( * ) Notice: Subject to any disclaimer, the term of this patent is extended or adjusted under 35 U.S.C. 154(b) by 364 days.

(21) Appl. No.: 18/366,665

(22) Filed: Aug. 7, 2023

(65) Prior Publication Data

US 2024/0042938 A1 Feb. 8, 2024

Related U.S. Application Data

(60) Provisional application No. 63/396,096, filed on Aug. 8, 2022.

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC ................................ B60R 3/02; B60R 3/002
See application file for complete search history.

(56) References Cited

U.S. PATENT DOCUMENTS 7,487,986 B2 * 2/2009 Leitner .................... B60R 3/02 280/166

FOREIGN PATENT DOCUMENTS

| | | | | |
|---|---|---|---|---|
| CN | 114435249 A | 5/2022 | | |
| EP | 2418124 A1 * | 2/2012 | .............. | B60R 3/02 |
| WO | 03039910 A1 | 5/2003 | | |

OTHER PUBLICATIONS

European Search Report for Application No. 23190195.0 Mailed Feb. 21, 2024.

* cited by examiner

*Primary Examiner* — James A Shriver, II

(57) ABSTRACT

All designs have features that prevent the running boards from over deploying and stowing. This ensures the mechanism does not exceed the design range of motion and prevents any excess forces on the system or vehicle. All designs use kinematic locks to prevent back driving in stowed and deployed positions, which allows more efficient gearboxes to be used.

12 Claims, 8 Drawing Sheets

39
46
50
58
C
44
68
45
70
64
62
67
40
65
74
66

39
46
C
50
72
58
60
44
68
54
64
70
45
62
67
65
40
74
66

46
39
60
58
50
72
44
68
48
54
42
70
64
62
40
67
65
74
66

44
68
40
45
D
62
50
58
70
66

FIVE AND SIX BAR LINKAGE MECHANISMS FOR VEHICLE STEPS

FIELD OF THE INVENTION

The present invention relates to new five and six bar linkage designs for vehicle steps that provide a kinematic lock to prevent back driving of the running board in the stowed and deployed positions.

BACKGROUND OF THE INVENTION

Most automated running board mechanisms use four bar linkages to deploy and stow the running board step. These four bar linkages have no kinematic lock function in the deployed position, and back drive is possible. They do have a kinematic lock in the stowed position, but this only prevents back driving when load is applied in a limited number of locations. To prevent back driving, current ARB mechanisms rely on worm gear pairs in the drive unit. Worm gear pairs lack reliability in preventing back driving. The non-back driveable function of worm gear pairs depend on parameters that are difficult to control, and they constrain designs to use low efficiency drive units.

It is desirable to develop new mechanisms that will replace four bar linkages and provide kinematic locks to prevent back driving of the running boards or steps.

SUMMARY OF THE INVENTION

The present invention is directed to a locking vehicle step bracket including several different types of link mechanisms. In all of the embodiments the link mechanism has at least five links and the link mechanism is connected to a vehicle and a step and the link mechanism moves the step move between a stowed position and a deployed position. The link mechanism further includes a least one main pivot of the link mechanism where one or more links of the at least five links rotate about so that the link mechanism has a first lock position when the link mechanism is at one of the deployed position and the stowed position, and the link mechanism has a second lock position when the link mechanism is at the other one of the deployed position and the stowed position.

Another embodiment is directed to a locking vehicle step bracket implementing a five bar mechanism that uses a roller in the upper mount to adjust the position of the running board and achieve locks in both the deployed and stowed positions. The actuator rotates with the linkage during operation. The mechanism integrates self-locking into the linkage, allowing the use of back-driving, high efficiency drive unit designs.

Another embodiment is directed to a locking vehicle step bracket implementing a five bar mechanism that uses a roller in the front arm to adjust the position of the running board and achieve lock in both deployed and stowed positions. This design is a further improvement over the first embodiment because it offers more protection for the roller and keeps the actuator stationary. The mechanism integrates self-locking into the linkage, allowing the use of back-driving, high efficiency drive unit designs.

Another embodiment is directed to a locking vehicle step bracket implementing a six bar mechanism that achieves a lock in both deployed and stowed positions of the running board. This design only uses traditional pivot joints instead of roller joints. The mechanism integrates self-locking into the linkage, allowing the use of back-driving, high efficiency drive unit designs.

All embodiments have features that prevent the running boards from over deploying and stowing. This ensures the mechanism does not exceed the design range of motion and prevents any excess forces on the system or vehicle. All designs use kinematic locks to prevent back driving in stowed and deployed positions, which allows more efficient gearboxes and actuators to be used.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
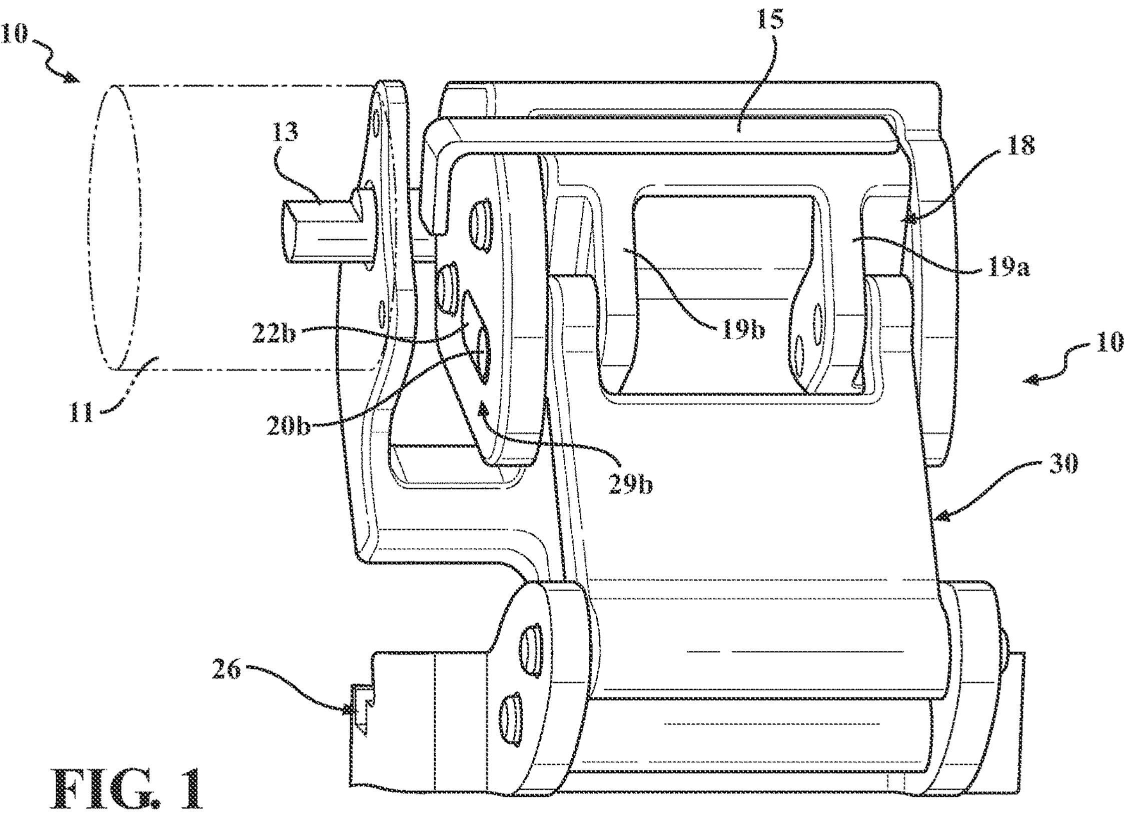
FIG. 1 is a rear side perspective view of a five bar link in the stowed position according to a first embodiment of the present invention.

The following description of the preferred embodiments is merely exemplary in nature and is in no way intended to limit the invention, its application, or uses.

All mechanisms described below are used to deploy and stow an automated running board. All three designs prevent over deploying and over stowing. Over deploying would put the running board step in an undesirable location for the user, while over stowing would apply excess force on the linkage and vehicle. At times in this application the terms "front" and "rear" will be used to describe the arms of the link mechanism. The term "front" refers to the arm that connects to a lower mount (to which the step is connected) at a point that is outward from the vehicle, while the term "rear" refers to the arm that connects to the lower mount at a point that is inboard on the vehicle relative to the front arm. The term "actuator" as used herein encompasses a motor, such as a rotary motor or the actuator can be a transmission mechanism connected to a motor.

Referring to FIGS. 1-3B a locking vehicle step bracket 9 implementing a link mechanism 10 that is a five bar linkage according to a first embodiment of the invention is shown. The link mechanism 10 has a step 12 of a running board connected thereon. The link mechanism 10 is connected to a vehicle 14 using an upper mount 24 connected a structural portion of the vehicle 14, such as a frame. The upper mount 24 is a fixed component that attaches the link mechanism 10 to the vehicle 14. An actuator 11 is attached externally to an input shaft 13 extending through a front arm 16. The input shaft 13 has an input bar 15 that contacts a seat 17 on a driving link 18, to transfer force from the actuator 11 to the driving link 18. The actuator 11 rotates the input shaft 13 causing the driving link 18 to rotate. The driving link 18 has two outer walls 19*a*, 19*b* defining a hollowed-out midsection. On either side of the driving link 18 extending from the two outer walls 19*a*, 19*b* are pin extrusions 20*a*, 20*b* that are inserted into slots 22*a*, 22*b* formed into the upper mount 24. The driving link 18 extrusions 20*a*, 20*b* are able to slide along the slots 22*a*, 22*b* cut in the upper mount 24 generally forming a roller joint 29*a*, 29*b* that is a first upper pivot joint on the upper mount 24.

There is also a front arm 16 that is an shaped component with three joints. On one end, the front arm 16 is pivotally coupled at a first driving link joint 28*a* to the driving link 18. The other end is pivotally coupled to a lower mount 26 at a first lower pivot joint 28*b*, which holds the step of the running board 12. Between the front arm 16 and the upper mount 24 is an upper pivot joint 28*c* located at the middle of the front arm 16. The front arm 16 pivots about this fixed joint during operation. The rear arm 30 is also connected to the lower mount 26 at a second lower pivot joint 34 and to the driving link 18 at a second driving link joint 32.

The above described components form the link mechanism 10 with one fixed point, about the upper pivot joint 28*c*, and the roller joint 29*a*, 29*b* formed by pin extrusions 20*a*, 20*b* moving in slots 22*a*, 22*b*. When the actuator 11 is powered on it rotates the input shaft 13, which rotates the driving link 18. This causes the pin extrusions 20*a*, 20*b* to move along the respective slots 22*a*, 22*b* in the upper mount 24. The rest of the links are then moved to either deploy or stow the running board. When the link mechanism 10 is in a terminal deploy position and a stow position, the pin extrusions 20*a*, 20*b* on the driving link 18 contact the end of the upper mount 24 slots 22*a*, 22*b* (FIGS. 2&3). This contact prevents the link mechanism 10 from over deploying or over stowing. The link mechanism 10 also forms a lock in these terminal positions (i.e., fully stowed or fully deployed positions) to prevent back driving.

Figure 2A:
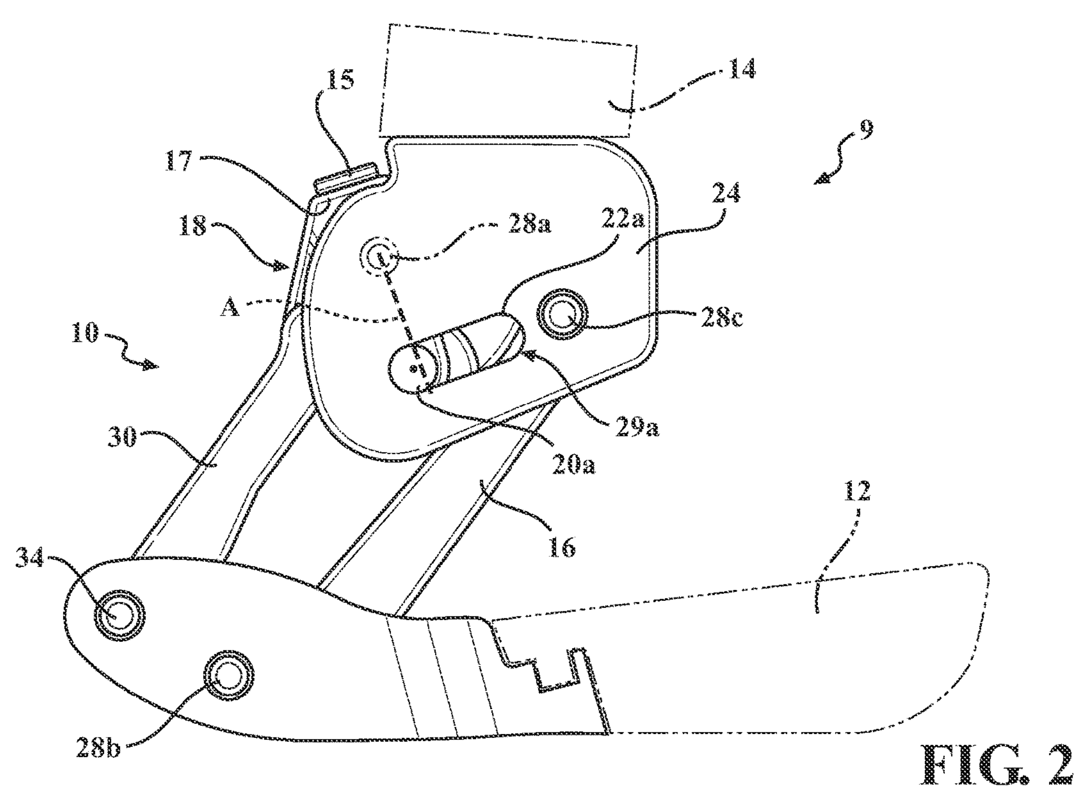
FIG. 2A is a right side elevational view of the five bar link in the stowed position according to the first embodiment.
Figure 2B:
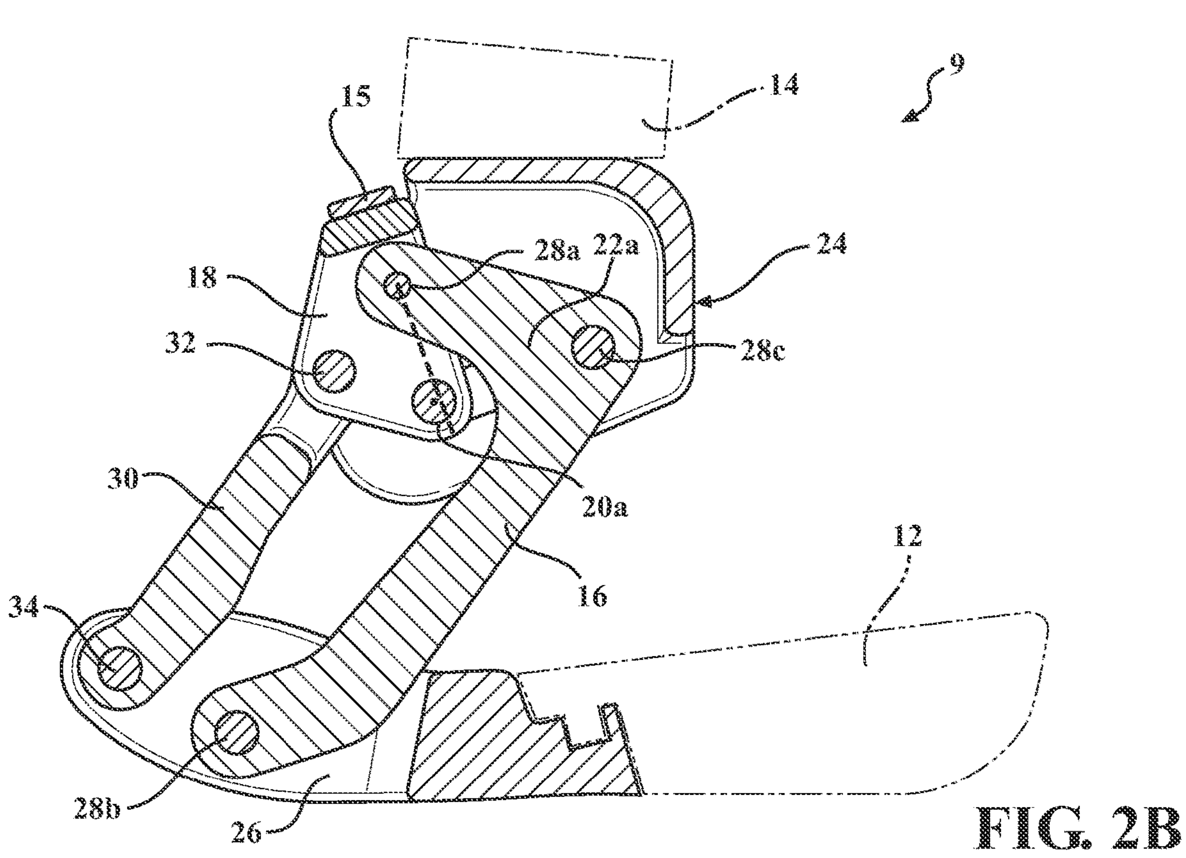
FIG. 2B is a cross-sectional, right side elevational view of the five bar link in the stowed position according to the first embodiment.

Referring to FIGS. 2A, 2B, 3A and 3B, the two locks are now described. In FIGS. 2A and 2B the link mechanism 10 is in the stowed position and a first lock is formed by a main pivot formed by the movement of the first driving link joint 29*a* and the pin extrusion 20*a*. When in the fully stowed position there is a stowed load path line A that is a line from the center of the first driving link joint 28*a* perpendicular to a side of the slot 22*a*. As shown a first lock is formed when the driving link 18 rotates about the pin extrusion 20*a*, 20*b* so that the first driving link joint 28*a* is past a center of the pin extrusion 20*a*, 20*b* (shown as a dot at the center of the pin extrusion 20*a*). In this first lock position, the stowed load path line A is past the center of the pin extrusion 20*a*. An identical load path line (not shown) is present on the opposite side of the link mechanism 10 with the pin extrusion 20*b* and the slot 22*b*. When the link mechanism 10 is moved to the fully deployed position a second lock is created as the driving link 18 rotates about the pin extrusion 20*a*. There is a deployed load path line B, which is a line from the center of the first driving link joint 28*a* to a side of the slot 22*a*. As shown the second lock is formed when the first driving link joint 28*a* rotates so that the deployed load path B is past the center (shown as a dot) of the pin extrusion 20*a*. An identical load path line (not shown) is present on the opposite side with the pin extrusion 20*b* and the slot 22*b*. When in the first lock position or the second lock position, any external force applied to the system will force the pin extrusions 20*a*, 20*b* into the end of the upper mount 24 slots 22*a*, 22*b*, and will not move the link mechanism 10. When the link mechanism 10 is in the stowed position the drive link 18 moves the first driving link joint 28*a* and the second driving link joint 32 to a location that is located above center of the pin extrusion 20*a*, 20*b*. When the link mechanism 10 is in the deployed position the drive link 10 moves the first driving link joint 28*a* and the second driving link joint 32 to a location that is located below the center of the pin extrusion 20*a*, 20*b*.

Figure 3A:
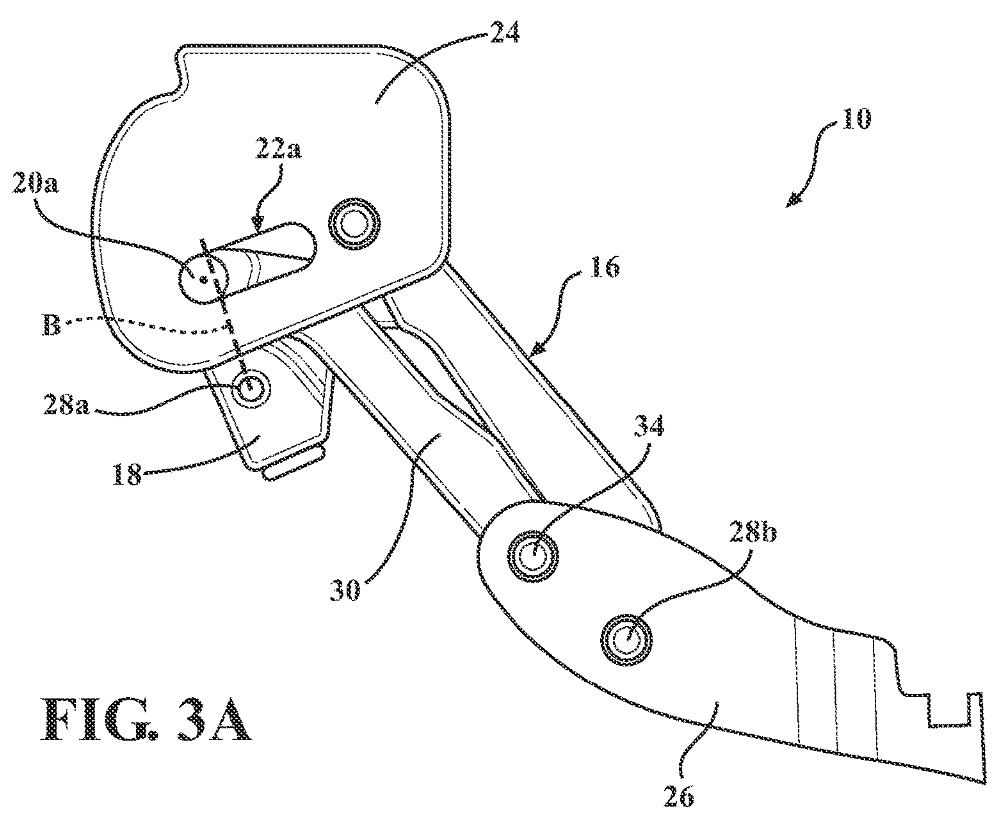
FIG. 3A is a right side elevational view of the five bar link in the deployed position according to the first embodiment.
Figures 3B, 4:
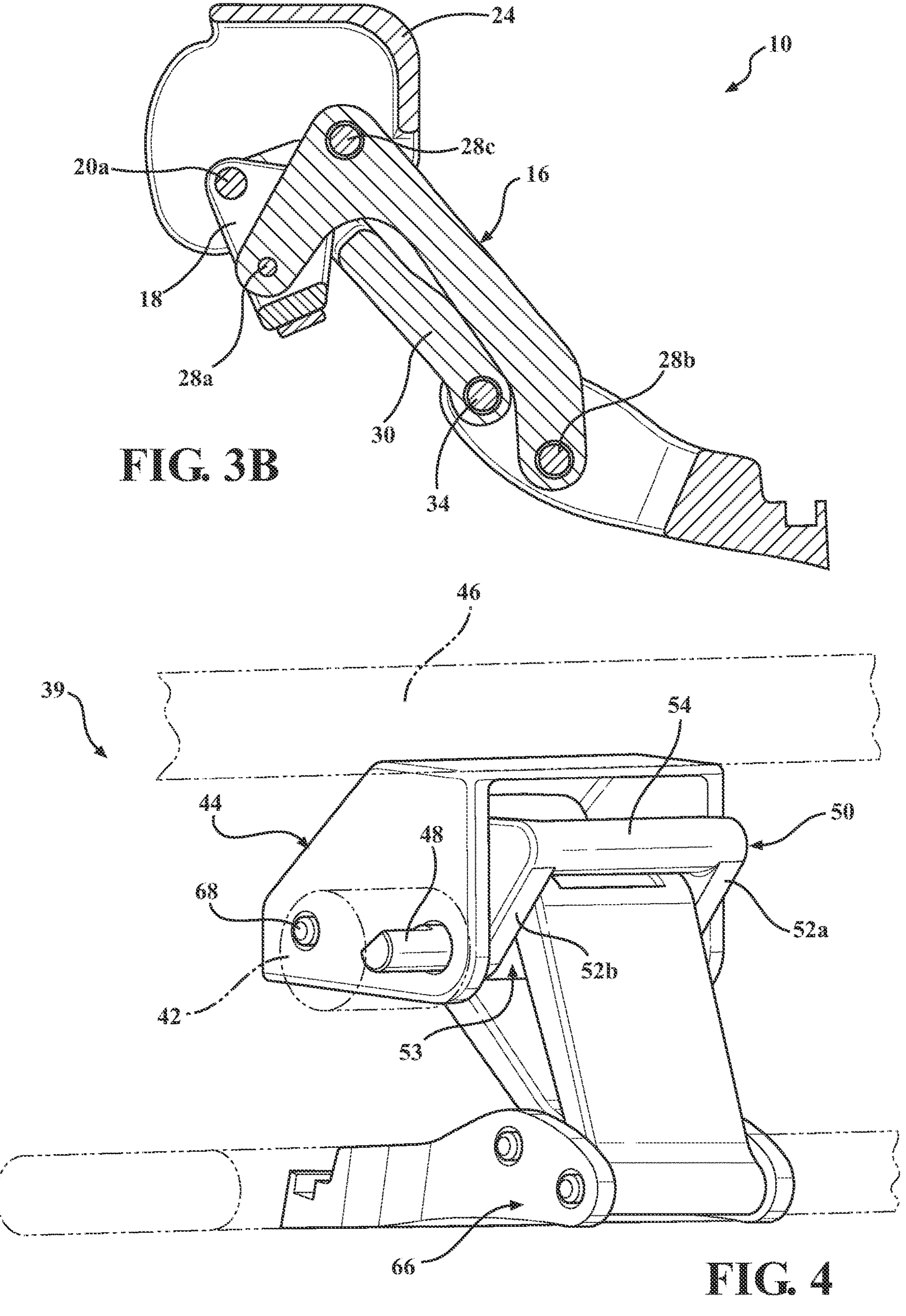
FIG. 3B is a cross-sectional, right side elevational view of the five bar link in the deployed position according to the first embodiment.
FIG. 4 is a rear side perspective view of a five bar link in the stowed position according to a second embodiment of the present invention.
Figures 5A, 5B:
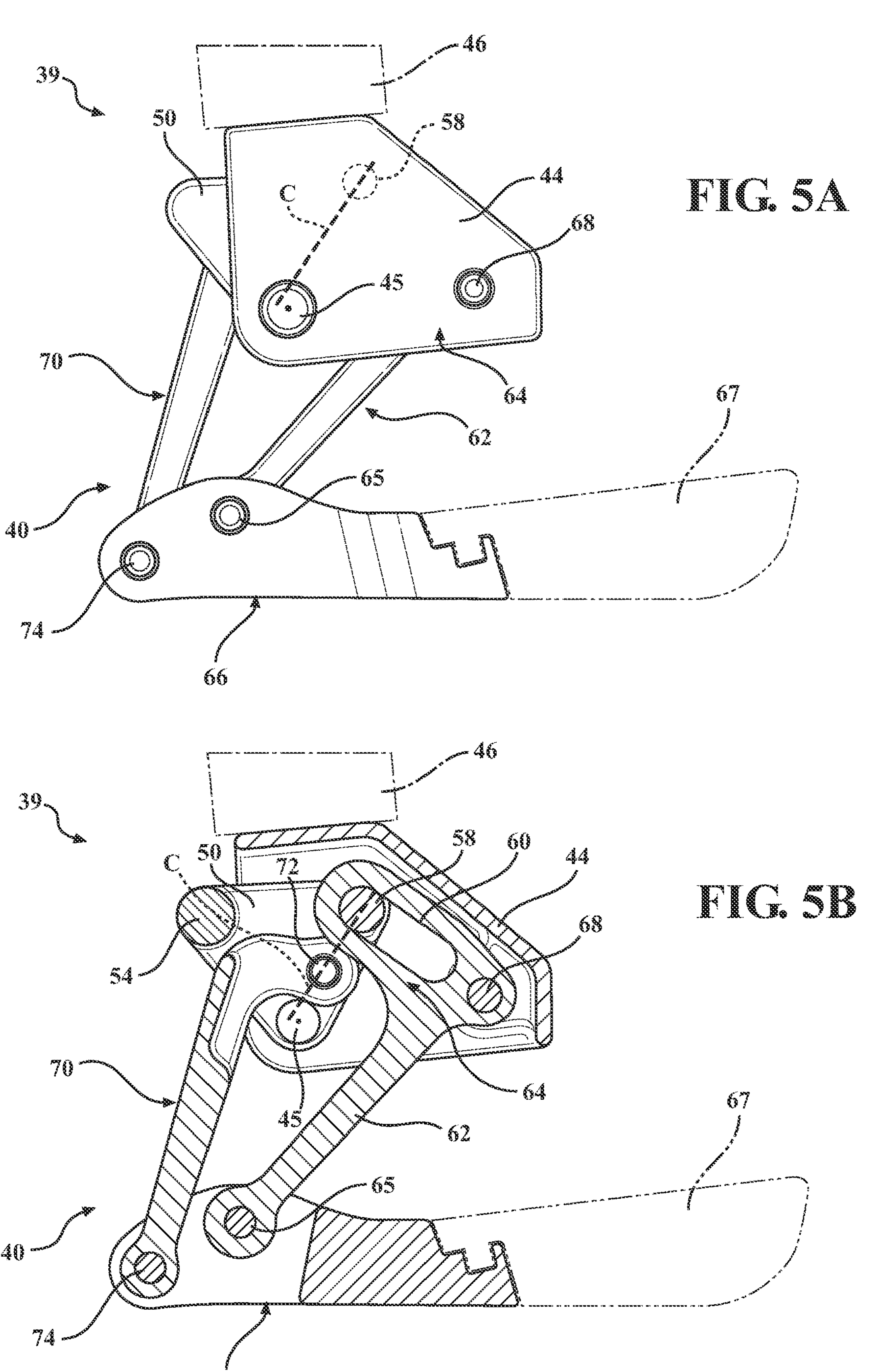
FIG. 5A is a right side elevational view of the five bar link in the stowed position according to the second embodiment.
FIG. 5B is a cross-sectional, right side elevational view of the five bar link in the stowed position according to the second embodiment.

FIGS. 4-6 show a locking vehicle step bracket 39 having a link mechanism 40 that is a five bar linkage shown according to a second embodiment of the invention. An actuator 42 is attached to an upper mount 44 and remains stationary during running board operation. The upper mount 44 is a fixed component that attaches to a portion of a vehicle 46, which can be a frame or other component. The actuator 42 rotates an input shaft 48, which is an extrusion attached to the main body of a driving link 50 that is connected to the upper mount 44 by a first upper mount pivot joint 45, opposite the input shaft 48. The driving link 50 is a triangular component with two outer walls 52*a*, 52*b* and a hollowed-out midsection 53. A bridge 54 connects the two outer walls 52*a*, 52*b* of the driving link 50 in one corner. A pin 58 extends between the two outer walls 52*a*, 52*b* connecting one corner of the driving link 50. The pin 58 passes through a slot 60 in a front arm 62 forming a roller joint 64. The front arm 62 is an 'L' shaped component. The slot 60 is located on one end, and the front arm 62 is pivotally coupled at a first lower pivot joint 65 of a lower mount 66 on the other end. The lower mount 66 holds a step 67 of a running board or retractable bed step for the vehicle 46. A second upper mount pivot joint 68 in the middle of the front arm 62 is fixed to the upper mount 44 between the upper mount 44 and the front arm 62. The front arm 62 rotates about this point.

A rear arm 70 is pivotally coupled to a drive link pivot joint 72 on the driving link 50, and to a second lower pivot joint 74 at a second location on the lower mount 65. These components form a five bar mechanism with two fixed points and one roller joint. When the actuator 42 is operated in a first direction the input shaft 48 rotates the driving link 50 causing the pin 58 of the roller joint 64 to move along the slot 60 to move the step 67 to the stowed position. When the actuator 42 is operated in a second direction the input shaft 38 rotates the driving link causing the pin 58 of the roller joint 64 to move in an opposite direction along the slot 60 to the deployed position. The rest of the links are then moved to either deploy or stow the step 67. When the link mechanism 40 is in the deployed and stowed positions, the pin 58 of the driving link 50 contacts the end of the slot 60 (FIGS. 5&6) as the front arm 62 rotates about second upper mount pivot joint 68. The link mechanism 40 has two lock positions, a first lock position when the link mechanism is stowed and a second lock position when the link mechanism is deployed.

In FIGS. 4, 5A, 5B, 5C the link mechanism 40 is in the stowed position and a first lock is formed by a main pivot formed by the first upper mount pivot joint 45 (also described as the first upper pivot joint on the upper mount 44) of the driving link 50 and the roller joint 64, which allows the driving link 50 to rotate about the first upper mount pivot joint 45 until a stowed load path line C, which is a line extending perpendicular to the sides of the slot 60 extending across the diameter of the pin 58 (when located at the end of the slot 60), is off center to the first upper mount pivot joint 45, thereby creating a mechanical lock between the front arm 62, rear arm 70 and driving link 50. The stowed load path line C is the load path of any forces applied to the step 67. Since the stowed load path line C is off center of the first upper mount pivot joint 45, there is a mechanical lock formed between the front arm 62, rear arm 70 and driving link 50.

Figures 5C, 6A:
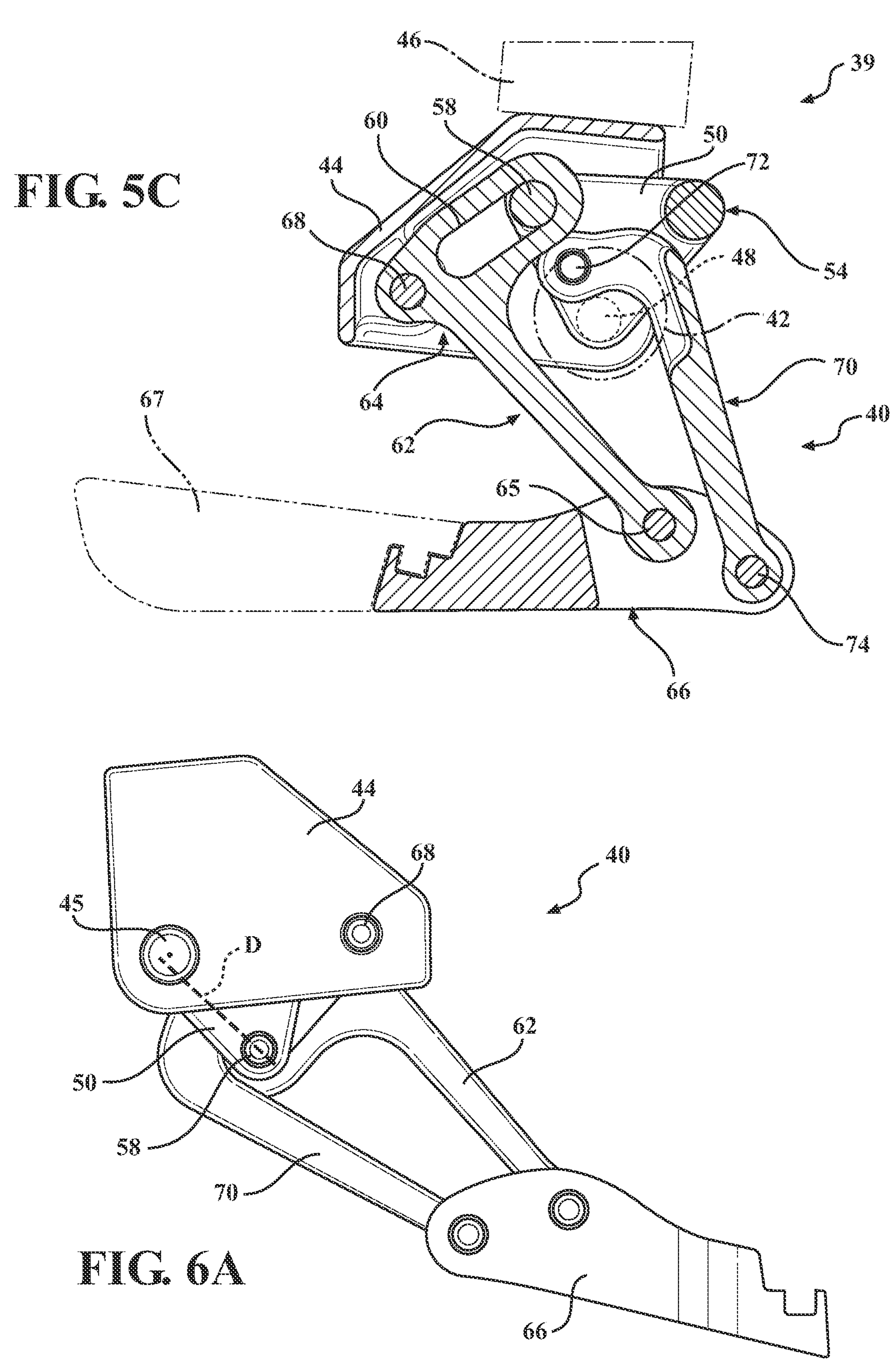
FIG. 5*c* is a cross-sectional, left side elevational view of the five bar link in the stowed position according to the second embodiment.
FIG. 6A is a right side elevational view of the five bar link in the deployed position, according to the second embodiment.
Figure 6B:
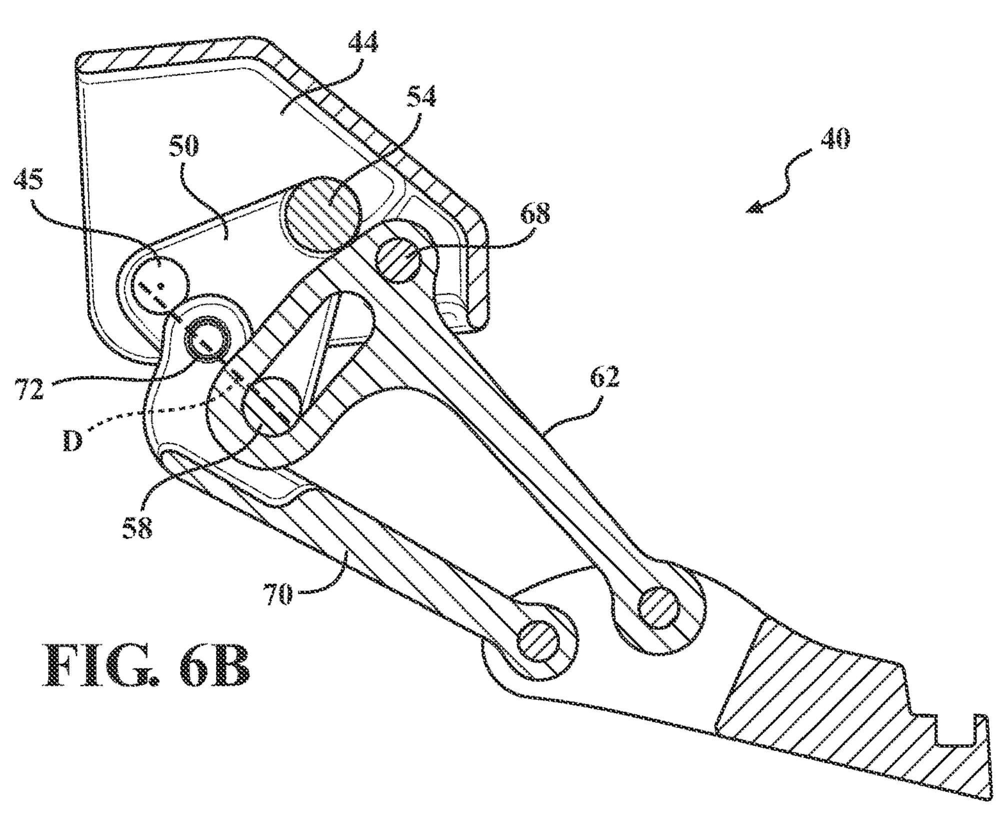
FIG. 6B is a cross-sectional, right side elevational view of the five bar link in the deployed position according to the second embodiment.

FIGS. 6A and 6B show the link mechanism 40 in the deployed position, the driving link 50 rotates about first upper mount pivot joint 45 causing the front arm 62 to rotate about second upper mount pivot joint 68, while the rear arm 70 rotates about the drive link pivot joint 72. The bridge 54 stops the driving link 50 from rotating by coming into contact with a top surface of the front arm 62. When in the fully deployed position there is a deployed path line D, that is a line extending across the diameter of the pin 58 (when located at the end of the slot 60) past the center, shown as a dot at the center of the first upper mount pivot joint 45. Since the deployed load path line D is off center of the first upper mount pivot joint 45, there is a mechanical lock formed between the front arm 62, rear arm 70 and driving link 50. The stowed load path line C is located more inboard on the vehicle from the step 67 than the deployed load path line D.

Figure 7:
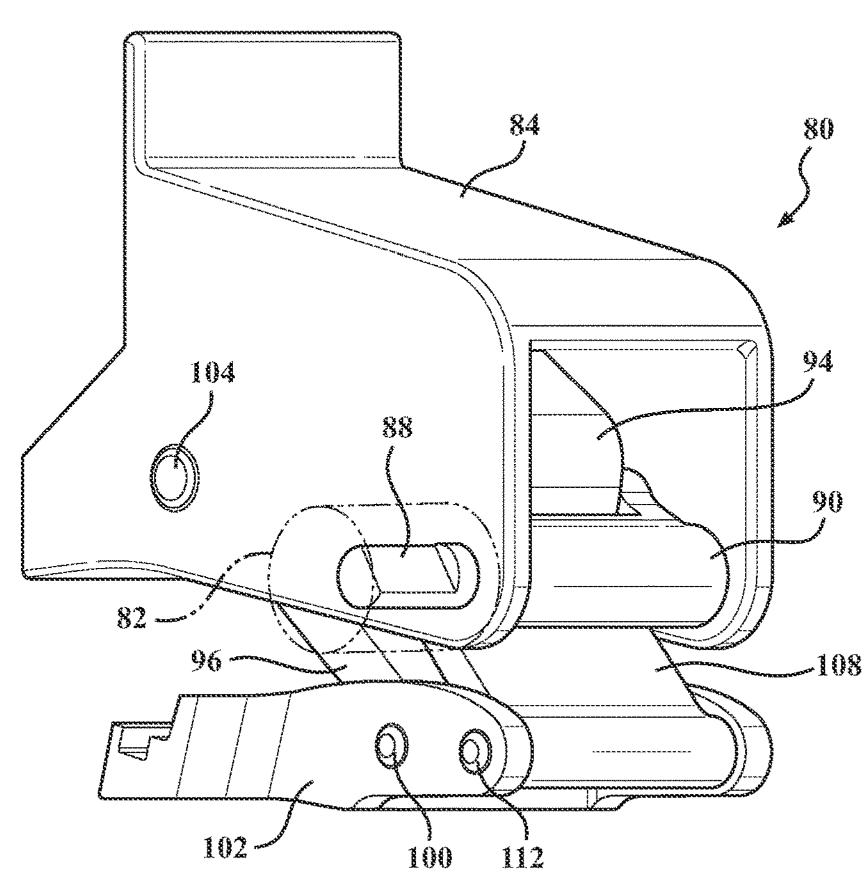
FIG. 7 is a rear side perspective view of a six bar link in the stowed position according to a third embodiment of the present invention.
Figure 8A:
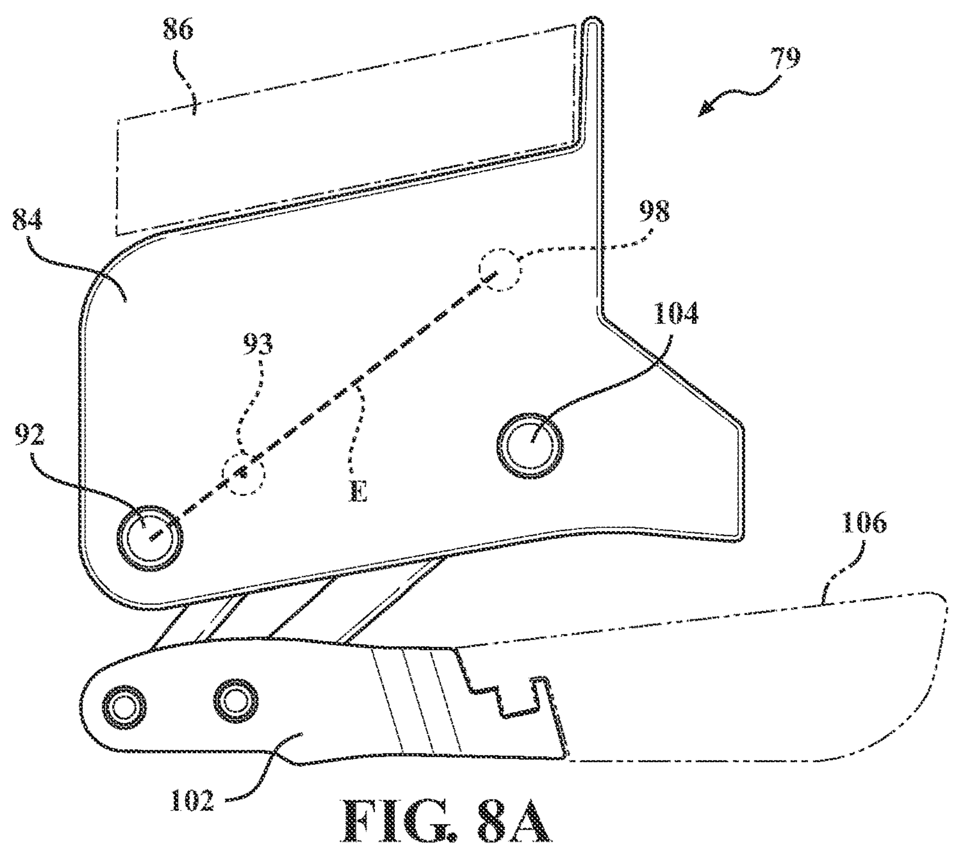
FIG. 8A is a right side elevational view of the six bar link in the stowed position according to the third embodiment.
Figure 8B:
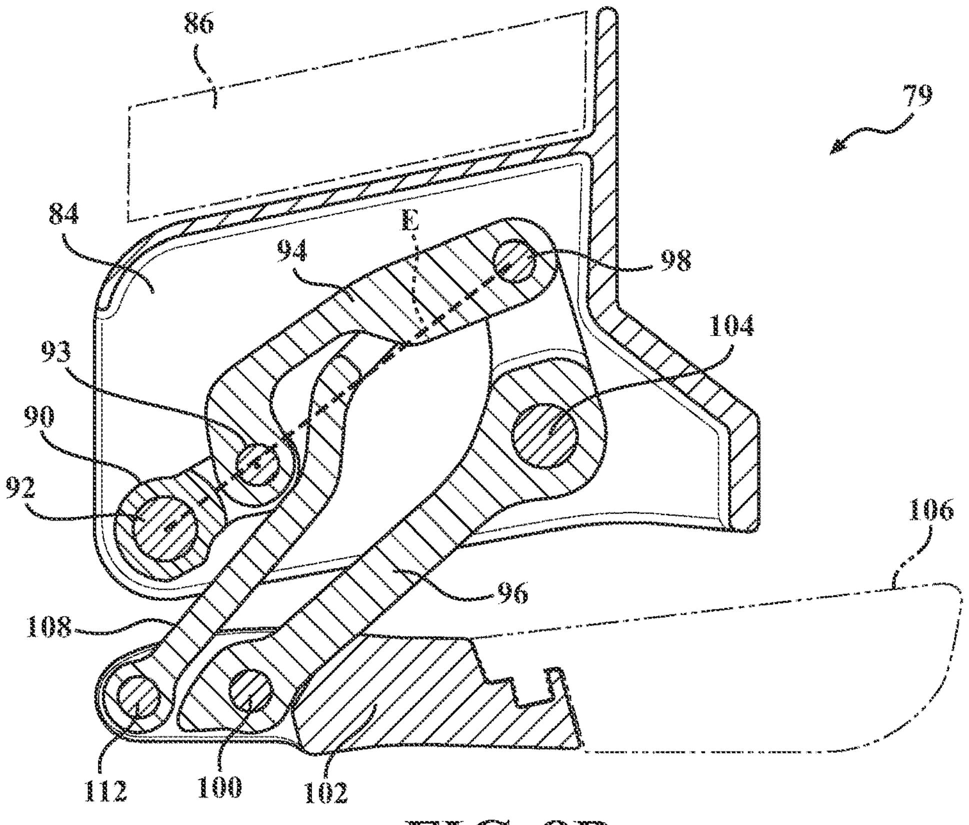
FIG. 8B is a cross-sectional, right side elevational view of the six bar link in the stowed position according to the third embodiment.
Figures 9A, 9B:
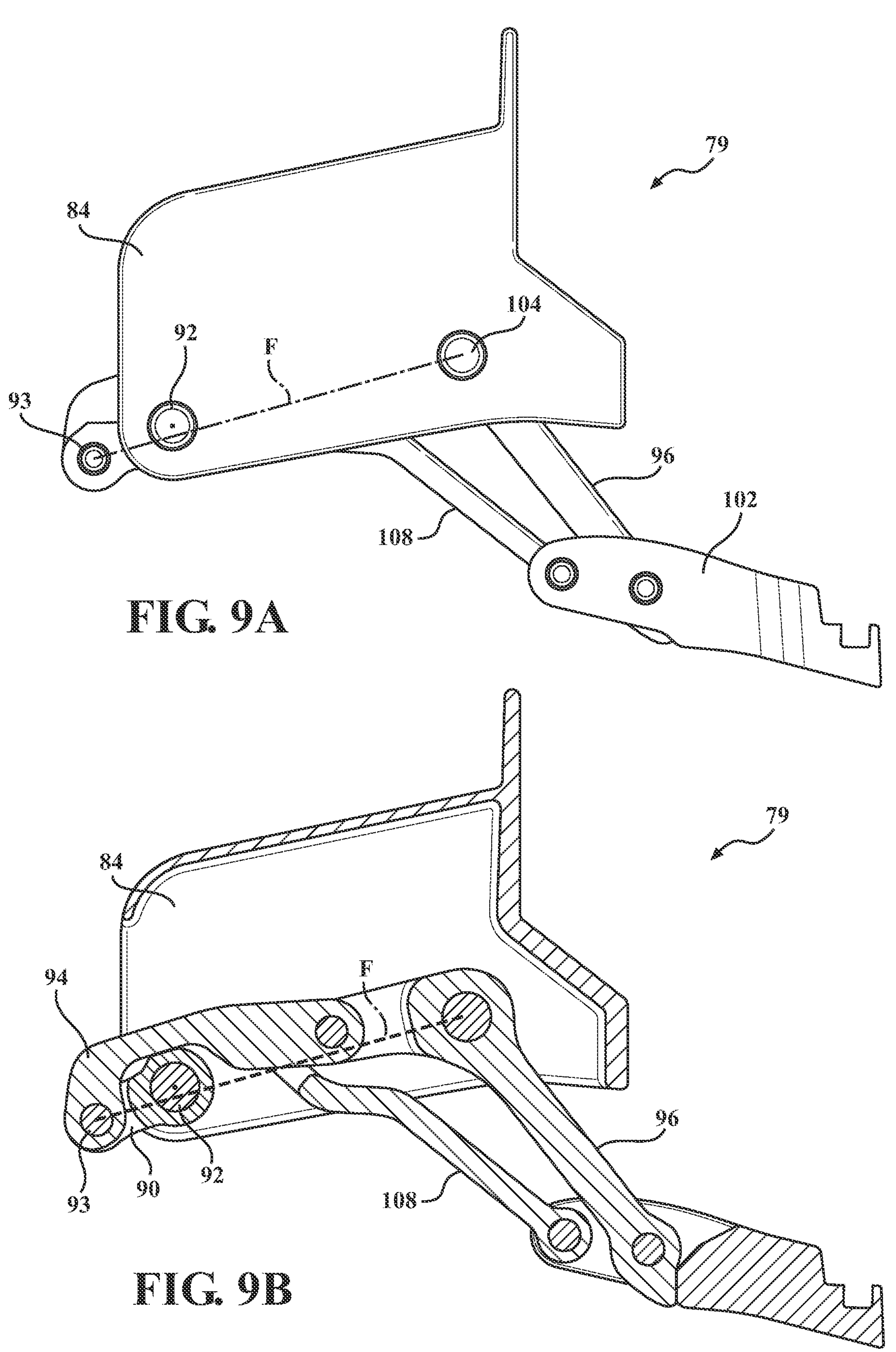
FIG. 9A is a right side elevational view of the six bar link in the deployed position, according to the third embodiment.
FIG. 9B is a cross-sectional, right side elevational view of the six bar link in the deployed position according to the third embodiment.

Referring to FIGS. 7-9 a locking vehicle step bracket 79 having link mechanism 80 that is a six bar linkage is shown according to a third embodiment of the invention. An actuator 82 is attached to the upper mount 84 and remains stationary during running board operation. The upper mount 84 is a fixed component that attaches a frame or other portion of a vehicle 86. The actuator 82 rotates an input shaft 88 rotatably connected to the upper mount 84 forming a first upper pivot joint 92 that rotates a driving link 90 about the first upper pivot joint 92. A connecting link 94 is pivotally coupled to the driving link 90 at a driving link joint 93. The front arm 96 is an shaped component and is coupled at one end to the connecting link 94 at a first upper connecting joint 98 and is pivotally coupled at a first lower pivot joint 100 on a lower mount 102 on the other end. The lower mount 102 holds a step 106. The front arm 96 rotates about a second upper pivot joint 104 that is in the middle of the front arm 96. The second upper pivot joint 104 is connected to the upper mount 84.

Further provided is a rear arm 108 that is coupled at a second upper connecting joint 110 to the connecting link 94 and at a second lower pivot joint 112 between the connecting link 108 and the lower mount 102. The above described components form the link mechanism 80 with two fixed points (i.e., the first upper pivot joint 92 and the second upper pivot joint 104) located on the upper mount 84. When the actuator 82 is powered on the driving link 90 rotates and moves the link mechanism 80 to deploy or stow the step 106. When the link mechanism 80 is fully stowed, the end of the driving link 90 contacts a recess on the surface of the rear arm 108 (FIG. 8). When the link mechanism 80 is fully deployed, the connecting link 94 contacts a base of the driving link 90 (FIG. 9). These contacts prevent over deploy and stow.

The link mechanism 80 also forms a lock in these terminal positions, which prevents back driving. When the step 106 is in the stowed position, a first lock is formed by rotation about a main pivot between first upper pivot joint 92 of the driving link 90 and a first upper connecting joint 98 between the front arm 96 and connecting link 94. There is a stowed load path line E, which is a line drawn between the center of the first upper pivot joint 92 and the first upper connecting joint 98 when the link mechanism 80 is in the stowed position. The first lock is formed when the link mechanism 80 moves to a location where the stowed load path line E is over the center (shown by a dot) of the driving link joint 93. This creates a mechanical lock of the link mechanism 80 since any forces on the step 106 will not allow the link mechanism 80 to deploy because the stowed load path line E is over center of the center of the driving link joint 93.

A second lock is formed when the link mechanism 80 is moved to the deployed position. There is a deployed load path line F, which is a line extending between the center of the driving link joint 93 to the center of the second upper pivot joint 104. The second lock is created when the link mechanism 80 moves to a location where the deployed load path line F is under the center (shown by a dot) of the first upper pivot joint 92. This creates a mechanical lock of the link mechanism 80 since any forces applied to the step 106 will not allow the link mechanism 80 to move toward the stowed position, since the deployed load path line F is under the center of the first upper pivot joint 92.

In all of the embodiments of the invention, the actuator 11, 42, 82 is a back-drivable actuator connected that is capable of rotating bi-directionally. It is within the scope of the invention for the actuator 11, 42, 82 to not have a worm gear.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A locking vehicle step bracket comprising:

a link mechanism connected between a vehicle and a step, the link mechanism is moveable between a stowed position and a deployed position, wherein the link mechanism includes:

an upper mount connected to the vehicle and having an upper pivot joint and at least one slot formed in the upper mount;

a driving link having at least one pin rotatably and slidably connected to the at least one slot of the upper mount, wherein the driving link rotates about the at least one pin;

a lower mount connected to the step and having a first lower pivot joint and a second lower pivot joint;

a front arm pivotally connected to the lower mount at the first lower pivot joint, the upper mount at the upper pivot joint and to the driving link at a first driving link joint; and a rear arm pivotally connected to the lower mount at the second lower pivot joint and to the driving link at a second driving link joint;

an actuator connected to an input shaft that is connected to the driving link so that when the actuator rotates the input shaft in a first direction the link mechanism is moved to the deployed position and when the actuator rotates the input shaft in a second direction the link mechanism is moved to the stowed position, wherein the link mechanism defines a first lock formed when the link mechanism is in the stowed position, the first lock is formed by rotation of the driving link about the at least one pin so that the first driving link joint is past a center of the at least one pin so that a stowed load path line from the center of the first driving link joint to a side of the at least one slot is past the center of the at least one pin.

2. The locking vehicle step bracket of claim 1 further comprising a second lock formed when the link mechanism is in the deployed position, the second lock is formed as the driving link rotates about the at least one pin so that the first driving link joint is past a center of the at least one pin so that a deployed load path line from the center of the first driving link to a side of the at least one slot is past the center of the at least one pin.

3. The locking vehicle step bracket of claim 1 wherein when the link mechanism is in the stowed position the drive link moves the first driving link joint and the second driving link joint to a location that is located above the center of the at least one pin and when the link mechanism is in the deployed position the drive link moves the first driving link joint and the second driving link joint to a location that is located below the center of the at least one pin.

4. The locking vehicle step bracket of claim 1 wherein the front arm is an "L" shaped component with the first driving link joint located at one end and the first lower pivot joint located at a second end.

5. A locking vehicle step bracket comprising:

a link mechanism connected between a vehicle and a step, the link mechanism is moveable between a stowed position and a deployed position, wherein the link mechanism includes:

an upper mount connected to the vehicle and having a first upper pivot joint and a second upper pivot joint;

a lower mount connected to the step and having a first lower pivot joint and a second lower pivot joint;

a front arm pivotally connected to the lower mount at the first lower pivot joint and the upper mount at the second upper pivot joint, the front arm also includes a slot;

a driving link having a pin rotatably and slidably connected to the slot of the front arm, wherein the driving link is rotatably connected to the upper mount at the first upper mount pivot joint;

a rear arm pivotally connected to the lower mount at the second lower pivot joint and to the driving link at a drive link pivot joint;

an actuator connected to an input shaft that is connected to the driving link so that when the actuator rotates the input shaft in a first direction the link mechanism moves to the deployed position and when the actuator rotates the input shaft in a second direction the link mechanism moves to the stowed position;

a first lock formed when the link mechanism is in the stowed position, the first lock is formed by the rotation of the driving link about the first upper mount pivot joint until a stowed load path line, which is a line extending across the diameter of the pin, is off center to the first upper mount pivot joint.

6. The locking vehicle step bracket of claim 5 further comprising a second lock when the link mechanism moves to the fully deployed position, the second lock is formed by the rotation of the driving link about the first upper mount pivot joint until a deployed load path line, which is a line extending across the diameter of the pin, is off center to a center of the first upper mount pivot joint.

7. The locking vehicle step bracket of claim 6 further comprising a bridge on the driving link, wherein the bridge stops the driving link from rotating by coming into contact with a top surface on the front arm when the link mechanism is moved to the deployed position.

8. The locking vehicle step bracket of claim 6 wherein the stowed load path line is located more inboard on the vehicle from the step than the deployed load path line.

9. A locking vehicle step bracket comprising:

a link mechanism connected between a vehicle and a step, the link mechanism is moveable between a stowed position and a deployed position, wherein the link mechanism includes:

an upper mount connected to the vehicle and having a first upper pivot joint and a second upper pivot joint;

a connecting link having a driving link joint, a first connecting joint and a second connecting joint;

a lower mount connected to the step and having a first lower pivot joint and a second lower pivot joint;

a front arm pivotally connected to the lower mount at the first lower pivot joint, the upper mount at a second upper pivot joint and to the connecting link at the first upper connecting joint;

a driving link connected to the upper mount at the first upper pivot joint and to the connecting link at the driving link joint;

a rear arm pivotally connected to the lower mount at the second lower pivot joint and to the connecting link at the second upper connecting joint;

an actuator connected to an input shaft that is connected to the driving link so that when the actuator rotates the input shaft in a first direction the link mechanism moves to the deployed position and when the actuator rotates the input shaft in a second direction the link mechanism moves to the stowed position;

a first lock formed when the link mechanism is in the stowed position, the first lock is formed by the rotation of the driving link about the first upper pivot joint until a stowed load path line, which is a line extending between the center of the first upper pivot joint and the first upper connecting joint, is over center of the driving link joint.

10. The locking vehicle step bracket of claim 9 further comprising a second lock when the link mechanism moves to the fully deployed position, the second lock is formed by the rotation of the driving link about the first upper pivot joint until a deployed load path line, which is a line extending between the center of the driving link joint to the center of the second upper pivot point, is under the center of the first upper pivot joint.

11. The locking vehicle step bracket of claim 10 wherein when the link mechanism is fully deployed, the connecting link contacts a base of the driving link.

12. The locking vehicle step bracket of claim 9 wherein when the link mechanism is fully stowed, the end of the driving link contacts a recess on the surface of the rear arm.

* * * * *